United States Patent

[11] 3,624,079

[72] Inventor Daniel Lednicer
Portage, Mich.
[21] Appl. No. 867,937
[22] Filed Oct. 20, 1969
[45] Patented Nov. 30, 1971
[73] Assignee The Upjohn Company
Kalamazoo, Mich.

[54] 5-(PHENYLSTRYL)-3METHYLISOXAZOLES
11 Claims, No Drawings
[52] U.S. Cl. ..................................................... 260/240 D,
260/307 H, 424/272
[51] Int. Cl. ...................................................... C07d 85/22
[50] Field of Search ........................................... 260/240 D

[56] References Cited
OTHER REFERENCES
Boris et al., Arch. Intern. Pharmacodyn. 151 (3– 4), 475– 489 (1964).

*Primary Examiner*—Henry R. Jiles
*Assistant Examiner*—G. Thomas Todd
*Attorneys*—John Kekich and Earl C. Spaeth

ABSTRACT: Novel 5-($\alpha$-phenylstyryl)-3-methylisoxazoles, processes for preparing the same and intermediates produced by said processes. The novel compounds of this invention are useful for treating hyperlipemic states in animals, including mammals.

5-(PHENYLSTRYL)-3-METHYLISOXAZOLES

BRIEF SUMMARY OF THE INVENTION

This invention relates to novel 5-($\alpha$-phenylstyryl)-3-methylisoxazoles and processes for preparing the same. The novel compounds of this invention have the formula:

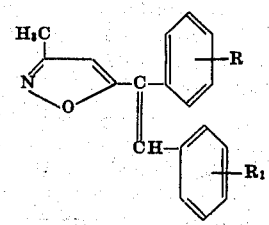

wherein R is selected from the group consisting of hydrogen, alkyl of from one to three carbon atoms, inclusive, hydroxy, alkoxy of from one to three carbon atoms, inclusive, alkanoyloxy of from one to three carbon atoms, inclusive, and the group

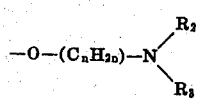

wherein $R_2$ and $R_3$ individually are similar or different alkyl groups of from one to three carbon atoms, inclusive, and when taken together with the attached nitrogen atom form the residue of a saturated heterocyclic amine of five to seven ring members, inclusive; n is an integer from 2 to 4, inclusive; and $R_1$ is selected from the group consisting of hydrogen, alkyl of from one to three carbon atoms, inclusive, alkoxy of from one to three carbon atoms, inclusive, and halo.

Examples of halo are fluoro, chloro and bromo. Examples of alkyl of from one to three carbon atoms, inclusive, are methyl, ethyl, propyl and isomeric forms thereof. Examples of alkoxy of from one to three carbon atoms, inclusive, are methoxy, ethoxy, propoxy and isomeric forms thereof. Examples of alkanoyloxy of from one to three carbon atoms, inclusive, are formyloxy, acetoxy and propionyloxy. The term "residue of a saturated heterocyclic amine of five to seven ring members, inclusive" is inclusive of pyrrolidino-, lower alkylpyrrolidino such as 2-methylpyrrolidino-, 2,2-dimethylpyrrolidino-, 3-methylpyrrolidino and the like; piperazino, lower alkylpiperazino such as 2-methylpiperazine, 4-methylpiperazino-, 2,4-dimethylpiperazino, and the like; piperidino, lower alkylpiperidino such as 2-methylpiperidino, 3-methylpiperidino, 4,4-dimethylpiperidino, and the like; morpholino, hexamethylenimino, homopiperazino, and the like.

The term "novel compounds of this invention" as used throughout the specification embraces the compounds represented by formula 1 above, including the acid addition salts and quaternary ammonium salts of said compounds that contain tertiary amino groups, and the alkali metal and alkaline earth metal salts of the compounds of formula 1 wherein R represents hydroxy.

The processes for making the novel compounds are illustrated by the following equations:

(A)

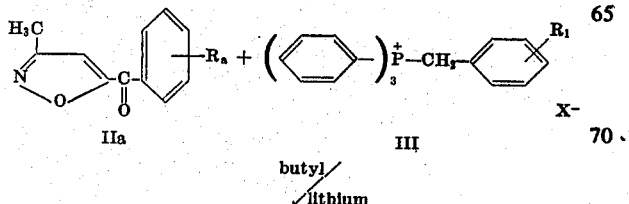

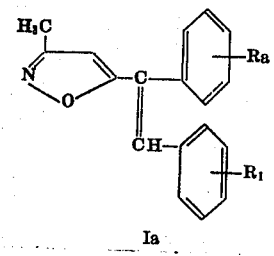

wherein $R_a$ is selected from the group consisting of hydrogen, alkyl of from one to three carbon atoms, inclusive, alkoxy of from one to three carbon atoms, inclusive, and alkanoyloxy of from one to three carbon atoms, inclusive, $R_1$ is the same as above, and X is halo, preferably chloro or bromo.

(B)

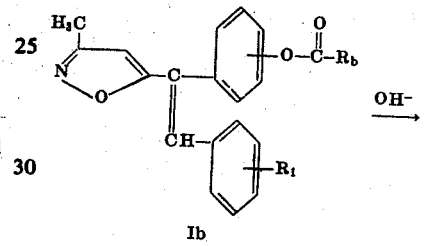

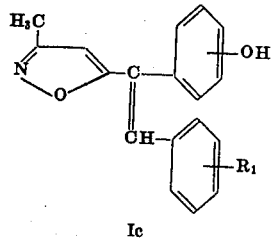

wherein $R_b$ is selected from the group consisting of hydrogen and alkyl of from one to two carbon atoms, inclusive, and $R_1$ is the same as above.

(C)

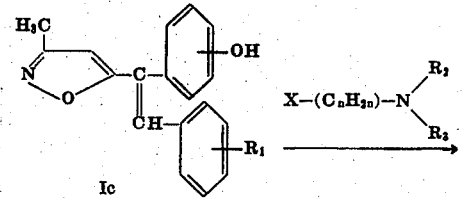

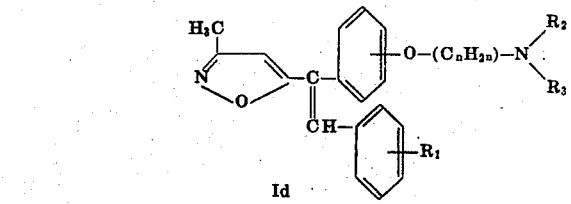

wherein X, $R_1$, $R_2$, $R_3$ and n are the same as above.

(D)

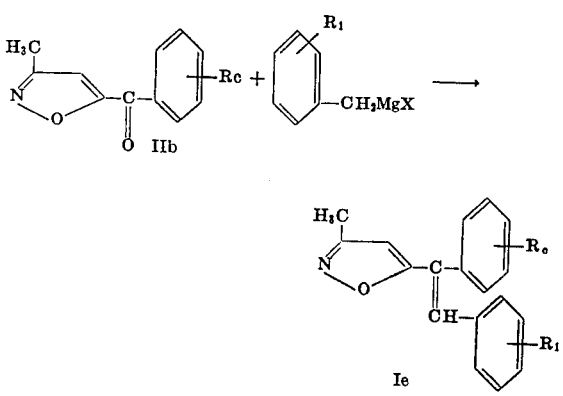

wherein X and $R_1$ are the same as above, and $R_c$ is selected from the group consisting of hydrogen, alkyl of from one to three carbon atoms, inclusive, alkoxy of from one to three carbon atoms, inclusive, and

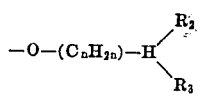

as defined above.

DETAILED DESCRIPTION

Process A, which involves the Wittig reaction, is conducted by reacting a phenyl 3-methyl-5-isoxazolyl ketone 11a with the ylide prepared from the appropriately substituted triphenylbenzylphosphonium halide 111 and butyl lithium in the presence of a solvent such as tetrahydrofuran. Other solvents that can be used include diethyl ether, benzene and dioxane. The molar ratio of 11a to 111 can vary from 1:1 to 1:2 and the reaction temperature from 0°–80° C. The product can be recovered from the reaction mixture by crystallization, evaporation, chromatography and combinations thereof.

The starting ketone 11a can be prepared by methods illustrated by the following flow scheme:

(E)

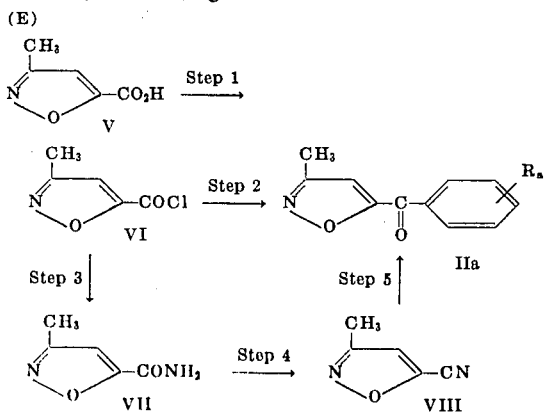

Step 1 involves converting 3-methylisoxazole-5-carboxylic acid V to its acid chloride VI. The ketone 11a can be prepared from VI by either of two methods. In the first method, VI is converted to the ketone 11a by the well known Friedel-Crafts acylation step 2. In the second method, VI is converted to the corresponding amide VII step 3; the amide is converted to the corresponding nitrile VIII step 4, which, in turn, is converted to the ketone 11a step 5 by reacting it with the appropriate Grignard reagent. The starting material V is readily available and the procedures utilized in the steps illustrated in flow scheme E are all well known in the art.

In Process B, a 5-[α-(p-alkanoyloxyphenyl)styryl]-3-methyl-isoxazole 1b is saponified under mild basic conditions to yield the corresponding 5-[α-(p-hydroxyphenyl)styryl]-3-methyl-isoxazole 1c. For example, 1b can be heated at reflux in the presence of a solution of sodium hydroxide in methanol.

In Process C, 1c is etherified by treating it with a (tertiary-amino)alkyl halide IV in the presence of a base such as sodium hydride, sodium amide, sodium hydroxide, sodium methoxide and the like. The etherification is conducted advantageously in the presence of an inert organic solvent such as benzene, tetrahydrofuran, dioxane and dimethylformamide, or mixtures thereof.

In Process D, a phenyl 3-methyl-5-isoxazolyl ketone 1b is reacted with the Grignard reagent prepared from a benzyl halide and magnesium. The reaction is conducted in the presence of an inert solvent such as either or tetrahydrofuran at a temperature of 0°–40° C. The resulting crude alcohol is dehydrated by heating in an inert solvent such as benzene, toluene or xylene in the presence of a strong acid such as p-toluenesulfonic acid, with azeotropic removal of the liberated water.

In all of the above processes, the products can be recovered from the reaction mixtures by conventional procedures such as crystallization, evaporation, chromatography and combinations thereof.

The acid addition salts of the invention comprise the salts of the compounds of formula I, wherein R is (tertiary-amino)-alkoxy, with pharmacologically acceptable acids such as sulfuric, hydrochloric, nitric, phosphoric, lactic, benzoic methane-sulfonic, -toluenesulfonic, salicylic, acetic, propionic, maleic, malic, tartaric, citric, cyclohexanesulfamic, succinic, nicotinic, ascorbic acids, and the like.

The quaternary ammonium salts of the invention are the salts obtained by reacting the tertiary-amino compounds of formula 1 with quaternating agents, for example alkyl halides, dialkyl sulfates, aralkyl halides, alkyl-arylsulfonates, and the like. The term "alkyl" means alkyl of from one to four carbon atoms, inclusive. The term "alkenyl" means alkenyl of from three to eight carbon atoms, inclusive, such as allyl, 2-butenyl, 2-pentenyl, 2-hexenyl, 2-heptenyl, 2-octenyl, and isomeric forms thereof. The term "aralkyl" means an aralkyl group containing from seven to 13 carbon atoms, inclusive, such as benzyl, phenethyl, 2-phenylpropl, benzhydryl and the like. The term "alkyl arylsulfonates" means the esters formed from alkanols and arysulfonic, and like acids. Examples of quaternary salts of the compounds of the invention are the methobromide, methiodide, ethobromide, propyl chloride, butyl bromide, methyl methosulfate, ethyl ethosulfate, allyl chloride, allyl bromide, benzyl bromide, benzhydryl chloride, methyl p-toluenesulfonate, ethyl p-toluenesulfonate and the like.

The compounds of the invention exhibit pharmacological activity in animals, including mammals. For example, they are useful in the treatment of hyperlipemic states in rats. The results of test wherein some of the novel compounds of this invention were utilized to treat hyperlipemic states in rats are set forth in the following table. The results are expressed in terms of minimum effective dosages (mg./kg.) required to significantly lower lipids with respect to controls. This type of assay is described by Garattini et al, "Drugs Affective Lipid Metabolism," page 144, Elsevier, Ams.

TABLE I

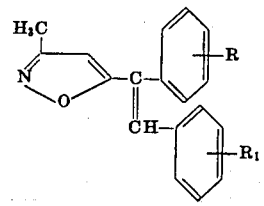

| No. | R | R₁ | Effective dose, mg./kg. | |
|---|---|---|---|---|
| 1 | p-OCH₃ | H | 1 | Mixture of isomers. |
| 2 | p-OCH₃ | H | 25 | Isomer A. |
| 3 | p-OCH₃ | p-CH₃ | 25 | Isomer A. |
| 4 | p-OCH₃ | p-CH₃ | 1 | Isomer B. |
| 5 | p-OCH₃ | p-Cl | 1 | |
| 6 | p-OCOCH₃ | H | 1 | |
| 7 | p-OH | H | 25 | |
| 8 | p-OCH₂CH₂N⟨ | H | 1 | Hydrochloride. |

Some of the novel compounds of this invention also exhibit antifertility activity. For example, 5-[α-(p-methoxy-phenyl)-m-methoxystyryl]-3-methylisoxazole, 5-[α-(p-hydroxy-phenyl)styryl]-3-methylisoxazole, and 3-methyl-5-[α-]8 p-[2-(1-pyrrolidinyl)ethoxyl]phenyl]styryl]isoxazole hydrochloride exhibit oral antifertility activity in rats when administered in dosages of 50 mg./kg.

For purposes of administration to birds and to mammals, including animals of economic value such as horses, cattle, sheep, pigs, mice, rats, rabbits and the like, the novel compounds of the invention can be combined with solid or liquid pharmaceutical carriers and formulated in the form of tablets, powder packets, capsules and the like solid dosage forms, using starch and like excipients, or dissolved in suitable solvents or vehicles for oral or parenteral administration.

Also, for mammals and birds food premixes, with starch, oatmeal, dried fishmeat, fishmeal, flour and the like can be prepared.

The novel compounds of this invention having the formula 1 wherein R is (tertiary-amino)alkoxy also form thiocyanic acid addition salts which, when condensed with formaldehyde, form resinous materials useful as pickling inhibitors according to U.S. Pat. No. 2,425,320 and U.S. Pat. No. 2,606,155. The fluosilicic acid addition salts are useful as mothproofing agents according to U.S. Pat. Nos. 1,915,334 and 2,075,359.

The following examples are set forth to illustrate my invention and to enable persons skilled in the art to better understand and practice the invention and are not intended to limit the same.

PREPARATION A  p-METHOXYPHENYL 3-METHYL-51-ISOXAZOLYL KETONE

Method 1 (Friedel - Crafts)

To a stirred, ice-cold solution of 20 ml. of anisole in 300 ml. of carbon disulfide is added 5.0 g. of aluminum chloride. To this mixture a solution of acid chloride from 5.0 g. of 3-methylisoxazole-5-carboxylic acid in 60 ml. of carbon disulfide is added over a period of 1 hour. The resulting mixture is allowed to stand at room temperature for 17 hours and then poured into a mixture containing 250 ml. of ice and 250 ml. of concentrated hydrochloric acid. The aqueous layer is separated and washed twice with ether. The combined organic layers are evaporated with a stream of nitrogen. The residue is dissolved in ether. The resulting solution is washed successively with aqueous sodium bicarbonate solution, water and saturated aqueous sodium chloride solution and then taken to dryness. The residue is chromatographed on 2 liters of magnesium silicate (Florisil) with 2.5 percent acetone 97.5 percent Skellysolve B hexanes (by volume); 400 ml. fractions are collected. The fractions containing crystalline material are combined. The crystalline material is recrystallized from aqueous methanol to give 1.58 g. of p-methoxyphenyl 3-methyl-5-isoxazolyl ketone, melting point 70°–73° C.

Method 2 (Grignard)

A solution of 2.16 g. of 3-methylisoxazole-5-carbonitrile in 30 ml. of tetrahydrofuran is added to the ice-cooled Grignard reagent prepared from 4.10 g. of p-bromoanisole and 0.54 g. of magnesium in 50 ml. of tetrahydrofuran. Following 18 hours standing at room temperature, 50 ml. of saturated aqueous ammonium chloride solution is added and the organic and aqueous layers are separated. The organic layer is washed, in turn, with water and saturated aqueous sodium chloride solution and then taken to dryness. The residue is mixed with 100 ml. of methanol and 25 ml. of 2.5N hydrochloric acid. Following 3 hours stirring at room temperature, most of the solvent is removed under reduced pressure. The mixture is extracted with ether and the extract is dried and evaporated to dryness. The residue is chromatographed on 250 ml. of Florisil with 7.5 percent acetone 92.5 percent Skellysolve B hexanes (by volume); 250 ml. fractions are collected. The crystalline fractions are combined and recrystallized from acetone Skellysolve B hexanes to give 0.97 g. of p-methoxyphenyl 3-methyl-5-isoxazolyl ketone, melting point 63°–67° C.

Anal.
Calcd. for C₁₂H₁₁NO₃:  N, 6.45.
Found:  N, 6.13.

Using the above Grignard procedure, but replacing p-bromoanisole by bromobenzene or the appropriately substituted bromobenzene is productive of the corresponding phenyl 3-methyl-5-isoxazolyl ketone representative of the phenyl 3-methyl-5-isoxazolyl ketones so obtained are:
o-methoxyphenyl 3-methyl-5-isoxazolyl ketone
m-methoxyphenyl 3-methyl-5-isoxazolyl ketone
o-ethoxyphenol3-methyl-5-isoxazolyl ketone
p-propoxyphenyl 3-methyl-5-isoxazolyl ketone
p-methylphenyl 3-methyl-5-isoxazolyl ketone
o-methylphenyl 3-methyl-5-isoxazolyl ketone
p-ethylphenyl 3-methyl-5-isoxazolyl ketone
p-propylphenyl 3-methyl-5-isoxazolyl ketone and
phenyl 3-methyl-5-isoxazolyl ketone.

PREPARATION B  p-HYDROXYPHENYL 3-METHYL5-ISOXAZOLYL KETONE

A solution of 2.0 g. of p-methoxyphenyl 3-methyl-5-isoxazolyl ketone (Preparation A) in 10 ml. of acetic acid and 10 ml. of 48 percent hydrobromic acid is heated at reflux for 4 hours. The resulting mixture is diluted with water and extracted with ether. The organic layer is washed, in turn, with water and aqueous sodium bicarbonate solution, and then extracted with four 24 ml. portions of 10 percent aqueous sodium hydroxide solution. Acidification of the extract with dydrochloric acid yields a fine precipitate which is extracted from the mixture with methylene chloride-ether. This last extract is taken to dryness and the residue is recrystallized twice from acetone Skelly solve B hexanes to give 1.10 g. of p-hydroxyphenyl 3-methyl-5-isoxazolyl ketone, melting point 180.5°–182° C.

Anal.
Calcd. for C₁₁H₉NO₃:  C, 65.02; H, 4.46.
Found:  C, 64.67; H, 4.19.

Using the procedure of Preparation B, but replacing p-methoxyphenyl 3-methyl-5-isoxazolyl ketone by o-methoxyphenyl 3-methyl-5-isoxazolyl ketone and m-methoxyphenyl 3-methyl-5-isoxazolyl ketone is productive of o-hydroxyphenyl 3-methyl-5-isoxazolyl ketone and m-hydroxyphenyl 3-methyl-5-isoxazolyl ketone, respectively.

PREPARATION C  p-ACETOXYPHENYL 3-METHYL-5-ISOXAZOLYL KETONE

A mixture of 4.34 g. of p-hydroxyphenyl 3-methyl-5-isoxazolyl ketone (Preparation B) and 40 ml. of acetic anhydride is heated at reflux for 4 hours. The excess acetic anhydride is removed under high vacuum. The residue is recrystallized from ethyl acetate to give 5.0 g. of p-acetoxyphenyl 3-methyl-5-isoxazolyl ketone, melting point 119°–122° C.

Anal.
Calcd. for C₁₃H₁₁NO₄:  C, 63.67; H, 4.52.
Found:  C, 63.61; H, 4.62.

Using the procedure of Preparation C, but replacing p-hydroxyphenyl 3-methyl-5-isoxazolyl ketone by o-hydroxyphenyl 3-methyl-5-isoxazolyl ketone and m-hydroxyphenyl 3-methyl-5-isoxazolyl ketone is productive of o-acetoxyphenyl 3-methyl-5-isoxazolyl ketone and m-acetoxyphenyl 3-methyl-5-isoxazolyl ketone, respectively.

Using the procedure of Preparation C, but replacing acetic anhydride with propionic anhydride and acetic formic anhydride is productive of p-propionyloxyphenyl 3-methyl-5-isoxazolyl ketone and p-formyloxyphenyl 3-methyl-5-isoxazolyl ketone, respectively.

EXAMPLE 1

5-[α-(p-METHOXYPHENYL)STYRYL]-3-METHYLISOXAZOLE (MIXTURE OF ISOMERS)

A solution of 0.97 g. of p-methoxyphenyl 3-methyl-5-isoxazolyl ketone (Preparation A) in 50 ml. of ether is added to the Grignard reagent prepared from 1.50 g. of benzyl chloride and 1 g. of magnesium in 25 ml. of ether. Following 16 hours standing at room temperature, 50 ml. of saturated aqueous ammonium chloride solution is added and the organic and aqueous layers are separated. The organic layer is washed, in turn, with water and saturated aqueous sodium chloride solution and then taken to dryness. The residue is chromatographed on 200 ml. of Florisil with 5 percent acetone 95 percent Skellysolve B hexanes (by volume); 200 ml. fractions are collected. The oily fractions are combined to yield 1.05 g. of crude product. A mixture of this oil and 100 mg. of p-toluenesulfonic acid in 100 ml. of benzene is heated under a Dean-Stark trap overnight. The resulting solution is washed once with an aqueous solution of sodium bicarbonate and taken to dryness. The residue is chromatographed on 100 ml. of silica gel with methylene chloride; 50 ml. fractions are collected. The solids are combined and recrystallized twice from ether Skellysolve B hexanes to give 0.48 g. of 5-[α-(p-methoxyphenyl)styryl]-3-methylisoxazole as a mixture of isomers, melting point 68°–75° C.

Anal.
Calcd. for $C_{19}H_{17}NO_2$:  C, 78.33; H, 5.88.
Found:  C, 78.34; H, 5.58.

Using the procedure of example 1, but replacing p-methoxyphenyl 3-methyl-5-isoxazolyl ketone by o-methoxyphenyl 3-methyl-5-isoxazolyl ketone and m-methoxyphenyl 3-methyl-5-isoxazolyl ketone is productive of 5-[α-(o-methoxyphenyl)styryl]-3-methyl isoxazole and 5-[α-(m-methoxyphenyl)styryl]-3-methyl-isoxazole, respectively.

EXAMPLE 2

5-[α-(p-METHOXYPHENYL)STYRYL]-3-METHYLISOXAZOLE (ISOMER A)

To an ice-cooled suspension of 10.8 g. of finely ground triphenylbenzylphosphonium bromide in 100 ml. of tetrahydrofuran is added 15.6 ml. of a 1.6N solution of butyl lithium in pentane and then a solution of 5.0 g. of p-methoxyphenyl 3- methyl-5-isoxazolyl ketone (Preparation A) in 100 ml. of tetrahydrofuran. The resulting mixture is stirred for 1 hour in the cold and 3 hours at reflux and then treated with 100 ml. of saturated aqueous ammonium chloride solution. The organic layer is separated, washed successively with water and saturated aqueous sodium chloride solution and then taken to dryness. The residue is chromatographed on 1 l. of Florisil with 5 percent acetone 95 percent Skellysolve B hexanes (by volume); 400 ml. fractions are collected. The crystalline fractions are combined and recrystallized twice from methanol to give 3.38 g. of an isomer of 5-[α-(p-methoxyphenyl)styryl]-3-methylisoxazole, melting point 110°–113° C.

Anal.
Calcd. for $C_{19}H_{17}NO_2$:  C, 78.33; H, 5.88.
found:  C, 78.52; H, 5.90.

Using the procedure of example 2, but replacing p-methoxyphenyl 3-methyl-5-isoxazolyl ketone by o-methoxyphenyl 3-methyl-5-isoxazolyl ketone and m-methoxyphenyl 3-methyl-5-isoxazolyl ketone is productive of 5-[α-(o-methoxyphenyl)styryl]-3-methyl isoxazole and 5-[α-(m-methoxyphenyl)styryl]-3-methylisoxazole, respectively.

EXAMPLE 3

CIS AND TRANS ISOMERS OF 5-[α-(p-METHOXYPHENYL)-p-METHYESTYRYL]-3-METHYLISOXAZOLE

A. MIXTURE of cis and trans isomers of 5-[α-(p-methoxyphenyl)-p-methylstyryl]-3-methylisoxazole To an ice-cooled suspension of 4.66 g. of triphenyl-p-methylbenzylphosphonium chloride in 50 ml. of tetrahydrofuran is added 7.3 ml. of 1.6N solution of butyl lithium in pentane and then a solution of 2.5 g. of p-methoxyphenyl 3-methyl-5-isoxazolyl ketone (Preparation A) in 50 ml. of tetrahydrofuran. The resulting mixture is stirred for 1 hour in the cold and 3 hours at reflux and then treated with 50 ml. of saturated aqueous ammonium chloride solution. The organic layer is separated, washed successively with water and saturated aqueous sodium chloride solution and then taken to dryness to yield a physical mixture of the cis and trans isomers of 5-[α-(p-methoxyphenyl)-p-methylstyryl]-3-methylisoxazole as a residue. The residue is chromatographed on 500 ml. of Florisil with 5 percent acetone 95 percent Skellysolve B (by volume); 400 ml. fractions are collected.

B. Isomer A

The material eluted in fraction 4 is recrystallized from Skellysolve B hexanes to give 1.65 g. of Isomer A of 5-[α-(p-methoxyphenyl)-p-methylstyryl]-3-methylisoxazole, melting point 113°–115° C.

Anal.
Calcd. for $C_{20}H_{19}NO_2$:  C, 78.66; H, 6.27.
Found:  C, 78.06; H, 6.19.

C. Isomer B

The material eluted in fractions 5 to 8 is recrystallized from methanol to give 0.44 g. of Isomer B of 5-[α-(p-methoxyphenyl)-p-methylstyryl]-3-methylisoxazole, melting point 146°–148° C.

Anal.
Calcd. for $C_{20}H_{19}NO_2$:  C, 78.66; H, 6.27.
Found:  C, 78.54; H, 6.26.

Using the procedure of example 3, but replacing triphenyl-p-methybenzylphosphonium chloride by the appropriately substituted triphenyl-alkylbenzylphosphonium chloride and/or p-methoxyphenyl 3-methyl-5-isoxazolyl ketone by the appropriately substituted alkoxyphenyl 3-methyl-5-isoxazolyl ketone is productive of the isomers of the corresponding 5-[α-(alkoxyphenyl)-alkylstyryl]-3-methylisoxazole. Representative of the 5-[α-(alkoxyphenyl)alkylstyryl]-3-methyl isoxazoles so obtained are 5-[α-(o-methoxyphenyl)-p-methylstyryl]-
5-[α-(m-methoxyphenyl)-p-methylstyryl]-
5-[α-(p-ethoxyphenyl)-p-methylstyryl]-
5-[α-(p-propoxyphenyl)-p-methylstyryl]-
5-[α-(p-methoxyphenyl)-p-ethylstyryl]-
5-[α-(p-isopropoxyphenyl)-o-propylstyryl]- and 5-[α-(p-methoxyphenyl)-m-ethylstyryl]-3-methylisoxazole.

EXAMPLE 4

5-[α-(p-METHOXYPHENYL)-p-CHLOROSTYRYL]-3-METHYL-ISOXAZOLE

To an ice-cold suspension of 4.90 g. of triphenyl-p-chlorobenzylphosphonium chloride in 50 ml. of tetrahydrofuran is added 7.3 ml. of 1.6N butyl lithium in pentane and then a solution of 2.5 g. of p-methoxyphenyl 3-methyl-5-isoxazolyl ketone (Preparation A) in 50 ml. of tetrahydrofuran. The resulting mixture is stirred for 1 hour in the cold and 3 hours at reflux and then treated with 50 ml. of saturated aqueous ammonium chloride solution. The organic layer is separated, washed successively with water and saturated aqueous sodium chloride solution and then taken to dryness. The residue is chromatographed on 400 ml. of Florisil with 2 percent acetone 98 percent Skellysolve B hexanes (by volume); 400 ml. fractions are collected. The material eluted in fractions 4–7 contains 1.51 g. of crude product. This product is recrystallized from methanol to give 1.05 g. of 5-[α-(p-methoxyphenyl)-p-chlorostyryl]-3-methylisoxazole, melting point 144.5°–147° C.

Anal.
Calcd. for C₁₉H₁₆ClNO₂:   C, 70.04; H, 4.95.
                  Found:  C, 69.90; H, 4.80.

Using the procedure of Example 4, but replacing triphenyl p-chlorobenzylphosphonium chloride by the appropriately substituted triphenyl-halobenzylphosphonium chloride and/or p-methoxyphenyl 3-methyl-5-isoxazolyl ketone by the appropriately substituted alkoxyphenyl 3-methyl-5-isoxazolyl ketone is productive of the corresponding 5-[α-(p-methoxyphenyl)halostyryl]-3-methylisoxazole. Representative of the 5-[α-(alkoxyphenyl)-halostyryl]-3-methylisoxazoles so obtained are: 5-[α-(p-methoxyphenyl-p-bromostyryl]-5-[α-(p-methoxypheny!)-p-fluorostyryl]-

5-[α-(p-methoxyphenyl)-o-chlorostyryl]-
5-[α-(o-methoxyphenyl)-m-chlorostyryl]-
5-[α-(p-ethoxyphenyl)-o-bromostyryl]- and
5-[α-(m-propoxyphenyl)-p-bromostyryl]-3-methylisoxazole.

EXAMPLE 5  5-[α-(p-METHOXYPHENYL)-m-METHOXYSTYRYL]-3-METHYL-ISOXAZOLE

To an ice-cold suspension of 4.85 g. of triphenyl-m-methoxybenzylphosphonium chloride in 50 ml. of tetrahydrofuran is added 7.3 ml. of 1.6N butyl lithium in pentane and then a solution of 2.5 g. of p-methoxyphenyl 3-methyl-5-isoxazolyl ketone (Preparation A) in 50 ml. of tetrahydrofuran. The resulting mixture is stirred for 1 hour in the cold and 3 hours at reflux and then treated with 50 ml. of saturated aqueous ammonium chloride solution. The organic layer is separated, washed successively with water and saturated aqueous sodium chloride solution and then taken to dryness. The residue is chromatographed on 500 ml. of Florisil with 4 l. each of 2 percent acetone 98 percent Skellysolve B hexanes (by volume) and then 5 percent acetone 95 percent Skellysolve B hexanes (by volume); 400 ml. fractions are collected. Fractions 7 to 11 are combined and recrystallized twice from Skellysolve B hexanes to give 1.26 g. of 5 -[α-(p-methoxyphenyl)-m-methoxystyryl]-3-methylisoxazole, melting point 70°–72° C.

Anal.
Calcd. for C₂₀H₁₉NO₃:   C, 74.74; H, 5.96.
                 Found: C, 74.19; H, 5.83.

Using the procedure of example 5, but replacing triphenyl-m-methoxybenzylphosphonium chloride by the appropriately substituted triphenyl-alkoxybenzylphosphonium chloride and/or p-methoxyphenyl 3-methyl-5-isoxazolyl ketone by the appropriately substituted alkoxyphenyl 3-methyl-5-isoxazolyl ketone is productive of the corresponding 5-[α-(alkoxyphenyl)alkoxystyryl]-3-methylisoxazole. Representative of the 5-[α-(alkoxyphenyl)-alkoxystyryl]-3-methylisoxazoles so obtained are:

5-[α-(p-methoxyphenyl)-o-methoxystyryl]-
5-]α-(o-methoxyphenyl)-m-methoxystyryl]-
5-[α-(p-ethoxyphenyl)-p-methoxystyryl]-
5-[α-(p-propoxyphenyl)-p-ethoxystyryl]-
5-[α-(o-methoxyphenyl)-p-propoxystyryl]-
5-[α-(m-methoxyphenyl) -p-methoxystyryl]- and
5-[α-(m-isopropoxyphenyl)-p-methoxystyryl]  -3- methylisoxazole.

EXAMPLE 6

5-[α-(p-ACETOXYPHENYL)STYRYL]-3-METHYLISOXAZOLE

To an ice-cold suspension of 15.0 g. of triphenylbenzylphosphonium bromide in 250 ml. of tetrahydrofuran is added 22 ml. of 1.6N butyl lithium in pentane and then a solution of 8.40 g. of p-acetoxyphenyl 3-methyl-5-isoxazolyl ketone (Preparation C) in 210 ml. of tetrahydrofuran. The resulting mixture is stirred for 1 hour in the cold and 3 hours at reflux and then treated with 50 ml. of saturated aqueous ammonium chloride solution. The organic layer is separated, washed successively with water and saturated aqueous sodium chloride solution and then taken to dryness. The residue is chromatographed on 1.2 l. of Florisil with 10 percent acetone 90 percent Skellysolve B hexanes (by volume); 400 ml. fractions are collected. Fractions 7–16 are combined and recrystallized from acetone Skellysolve B hexanes to give 7.50 g. of crude product. This product is recrystallized from acetone Skellysolve B hexanes to yield 4.2 g. of 5-[α-(p-acetoxyphenyl)-styryl]-3-methylisoxazole, melting point 134°–136° C.

Anal.
Calcd. for C₂₀H₁₇NO₃:   C, 75.22; H, 5.37.
                 Found: C, 74.87; H, 5.37

Using the procedure of example 6, but replacing triphenylbenzylphosphonium bromide by the appropriately substituted triphenylvenzylphosphonium bromide and/or p-acetoxyphenyl 3-methyl-5-isoxazolyl ketone by the appropriately substituted alkanoyloxyphenyl 3 -methyl-5-isoxazolyl ketone is productive of the corresponding 5-[α-(alkanoyloxyphenyl)styryl]-3-methyl-isoxazole. Representative of the 5-[α-(alkanoyloxyphenyl)-styryl]-3-methylisoxazoles so obtained are:

5-[α-(o-acetoxyphenyl)styryl]-
5-[α-(m-acetoxyphenyl)styryl]-
5-[α-(p-acetoxyphenyl)-p-methylstyryl] -
5-[α-(p-acetoxyphenyl)-p-methoxystyryl]-
5-[α-(p-acetoxyphenyl)-o-chlorostyryl]-
5-[α-(p-propionyloxyphenyl)styryl)-
5-[α-(p-formyloxyphenyl)styryl - and 5-[α-(p-acetoxyphenyl)-o-methylstyryl]-3-methylisoxazole.

EXAMPLE 7

5-[α-(p-HYDROXYPHENYL)STYRYL -3-METHYLISOXAZOLE

A mixture of 7.50 G. OF %-[α-(p-acetoxyphenyl)styryl]-3-methylisoxazole (example 6) and 20 ml. of 1N sodium hydroxide in 80 ml. of methanol is heated at reflux for 2 hours. The bulk of the solvent is removed in vacuo. The residue is suspended in water, acidified with 2.5N hydrochloric acid and extracted with methylene chloride and either. The extracts are combined, washed successively with water and saturated aqueous sodium chloride solution and taken to dryness. The residue is recrystallized twice from aqueous methanol to give 5.67 g. of crude product. This product is recrystallized twice from aqueous methanol to give 5-[α-(p-hydroxyphenyl)styryl -3-methyl-isoxazole, melting point 154°–60° C.

Anal.
Calcd. for C₁₈H₁₅NO₂:   C, 77.96; H, 5.45.
                 Found: C, 78.26; H, 5.41.

Using the procedure of example 7, but replacing 5-[α-(p-acetoxyphenyl)styryl -3-methylisoxazole by the appropriately substituted  5-[α-(alkanoylphenyl)styryl]-3-methyl-isoxazole is productive of the corresponding 5-[α-(hydroxy-phenyl)styryl -3-methylisoxazole. Representative of the 5-[α-(hydroxyphenyl)styryl]3-methylisoxazoles so obtained are:
5-[α-(o-hydroxyphenyl)styryl]-3-methylisoxazole
5-[α-(m-hydroxyphenyl)styryl]-3-methylisoxazole
5-[α-(p-hydroxyphenyl)-p-methylstyryl]-3-methylisoxazole
5-[α-(p-hydroxyphenyl) -p-chlorostyryl]-3-methylisoxazole
5-[α-(o-hydroxyphenyl)-o-ethylstyryl]-3-methylisoxazole and
5-[α-(m-hydroxyphenyl)-o-propylstyryl]-3-methylisoxazote.

EXAMPLE 8

3-METHYL-5-[ααp-α2-(1-PYRROLIDINYL)ETHOXY

]PHENYL]-STYRYL]ISOXAZOLE AND HYDROCHLORIDE THEREOF

To a solution of 2.77 g. of 5-[α-(p-hydroxyphenyl)styryl]-3-methylisoxazole example 7 in 25 ml. of dimethyl formamide and 75 ml. of benzene is added 0.43 g. of 56 percent dispersion of sodium hydride i mineral oil. At the end of 30 minutes there is added 2.70 g. of 1mixture (by weight) of toluene and 1-(2-chloroethyl)pyrrolidine. Following 16 hours heating under reflux the mixture is treated with water. The organic layer is separated, washed with water, a saturated aqueous solution of sodium chloride and taken to dryness to give 3-methyl-5-[α- [p-[2-(1 -pyrrolidinyl)ethoxy]phenyl]styryl]isoxazole as a gum. This gum is taken up in ether and treated with ethereal hydrogen chloride. The precipitated solid is separated from the mixture and recrystallized twice from methylene chloride-ethyl acetate to give 2.22 g. of 3-methyl-5-[α-[p-[2-(1-pyrrolidiny) ethoxy]-phenyl]styryl]isoxazole hydrochloride.

Anal.
Calcd. for C₂₄H₂₆N₂O₂·HCl    C, 70.14; H, 6.61.
Found:    C, 69.46; H, 6.48.

Using the procedure of example 8, but replacing 5-[α-(p-hydroxyphenyl)styryl]-3-methylisoxazole by the appropriately substituted 5-[α-(hydroxyphenyl)styryl]-3-methylisoxazole and/or 1-(2-chloroethyl)pyrrolidine by the appropriately substituted (tertiary-amino)alkyl halide is productive of the corresponding 3-methyl-5-[α-[[2-(tertiary-amino)alkoxy]phenyl]styryl]isoxazoles and hydrochlorides so obtained are: 3-methyl-5-[α-[o-[2-(1-pyrrolidinyl)ethoxy]-
3-methyl-5-[α-[m-[-(1-pyrrolidinyl]ethoxyl]-
3-methyl-5-[α-[p-[2-(piperidino)ethoxy]-
3-methyl-5-[α-[o-[2-(piperidino)ethoxy]-
3-methyl-5-[α-[p-[2-(piperazino)ethoxy]-
3-methyl-5-[α-[p-[2-(hexamethyleneimino)ethoxyl]-
3-methyl-5-[α-[p-[2-(dimethylamino)ethoxy]-
3-methyl-5-[α-[p-[2-(diethylamino)propoxy]-
3-methyl-5-[α-[p-[3-(2-methyl-2-pyrrolidino)propoxy]-
3-methyl-5-[α-[p-[2-(2-methylpiperidono)ethoxy]-
2-methyl-5-[α-[p-[2-(2-methylpiperazino)ethoxy]-
3-methyl-5-[α-[p-[2-(morpholino)ethoxy]phenyl]styryl]isoxazoles and hydrochlorides thereof

EXAMPLE 9

5-(α-PHENYLSTYRYL)-3-METHYLISOXAZOLE

To an ice-cooled suspension of 10.8 g. of finely ground triphenylbenzylphosphonium bromide in 100 ml. of tetrahydrofuran is added 15.6 ml. of a 1.6N solution of butyl lithium in pentane and then a solution of 4.3 g. of phenyl 3-methyl-5-isoxazolyl ketone in 100 ml. of tetrahydrofuran. The resulting mixture is stirred for 1 hour in the cold and 3 hours at reflux and then treated with 100 ml. of saturated aqueous ammonium chloride solution. The organic layer is separated, washed successively with water and saturated aqueous sodium chloride solution and then taken to dryness. The residue is chromatographed on 1 l. of Florisil with 5 percent acetone 95 percent Skellysolve B hexanes (by volume); 400 ml. fractions are collected. The crystalline fractions are combined and recrystallized twice from methanol to give 5-(α-phenylstyryl)-3-methylisoxazole.

Following the procedure of example 9, but replacing phenyl 3-methyl-5-isoxazolyl ketone by p-methylphenyl 3-methyl-5-isoxazolyl ketone is productive of 5-[α-(p-methylphenyl)styryl]-3-methylisoxazole.

1. A compound selected from the class consisting of
a. Compounds having the formula

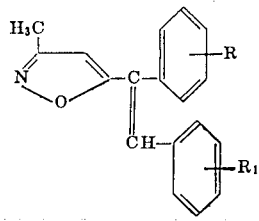

wherein R is selected from the group consisting of hydrogen, alkyl of from one to three carbon atoms, inclusive, hydroxy, alkoxy of from one to three carbon atoms, inclusive, alkanoyloxy of from one to three carbon atoms, inclusive, and the group

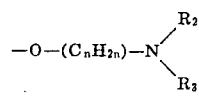

wherein $R_2$ and $R_3$ individually are similar or different alkyl groups of from one to three carbon atoms, inclusive, and when taken together with the attached nitrogen atom form pyrrolidino, loweralkylpyrrolidino, piperazino, loweralkylpiperazino, piperidino, loweralkylpiperidino, morpholine, hexamethyleneimino and homopiperazino n is an integer from 2 to 4, inclusive; and $R_1$ is selected from the group consisting of hydrogen, alkyl of from one to three carbon atoms, inclusive, alkoxy of from one to three carbon atoms, inclusive, and halo;
b. the addition salts with pharmacologically acceptable acids of those compounds of the above formula wherein R contains a tertiary-amino group; and
c. the quaternary ammonium salts of those compounds of the above formula wherein R contains a tertiary-amino group.

2. A compound of claim 1 having the formula of 1 wherein R is p-methoxy and $R_1$ is hydrogen.

3. The isomer of a compound of claim 2 having the formula of 1 wherein R is p-methoxy and $R_1$ is p-methyl and having a melting point of 113°–115° C.

4. The isomer of a compound of claim 1 having the formula of 1 wherein R is p-methoxy and $R_1$ is p-methyl and having a melting point of 113°–115° C.

5. The isomer of a compound of claim 1 having the formula of 1 wherein R is p-methoxy and $R_1$ is p-methyl and having a melting point of 146°–148°C.

6. A compound of claim 1 having the formula 1 wherein R is p-methoxy and $R_1$ is p-chloro.

7. A compound of claim 1 having the formula 1 wherein R is p-methoxy and $R_1$ is m-methoxy.

8. A compound of claim 1 having the formula 1 wherein R is p-acetoxy and $R_1$ is hydrogen.

9. A compound of claim 1 having the formula 1 wherein R is p-hydroxy and $R_1$ is hydrogen.

10. A compound of claim 1 having the formula 1 wherein R is p-[2-(1-pyrrolidinyl)ethoxy] and $R_1$ is hydrogen.

11. The hydrochloride of the compound of claim 10.

* * * * *

UNITED STATES PATENT OFFICE
CERTIFICATE OF CORRECTION

Patent No. 3,624,079                              Dated Nov. 30, 1971

Inventor(s)  Daniel Lednicer

It is certified that error appears in the above-identified patent and that said Letters Patent are hereby corrected as shown below:

Column 1, line 49, for "Methylpiperazine" read -- Methyl-piperazino --. Column 3, line 28, for "H" read -- N --. Column 4 line 13, for "1b" read -- IIb --. Column 4, line 16, for "either" read -- ether --. Column 4, line 30, for "-toluenesulfonic" read -- p-toluenesulfonic --. Column 4, line 44, for "2-phenylpropl" read -- 2-phenylpropyl --. Column 4, line 46, for "arysulfonic" read -- arylsulfonic --. Column 4, line 46, for " , and like acids." read -- acids such as benzenesulfonic, p-toluenesulfonic, xylenesulfonic, and like acids. --. Column 5, line 17, for "α-]8 p-[" read -- α-[p-[ --. Column 5, line 18, for "ethoxy]" read -- ethoxy] --. Column 5, line 45, for "51-Isoxazolyl" read -- 5-Isoxazolyl --. Column 6, line 34, for "Methyl5-" read -- Methyl-5- --. Column 8, line 7, for "Methylestyryl" read -- Methylstyryl --. Column 9, line 20, for "methoxyphenyl-p-" read -- methoxyphenyl)-p- --. Column 10, line 23, for "triphenylvenzylphosphonium" read -- triphenylbenzyl-phosphonium --. Column 10, line 34, for ")" read -- ] --. Column 10, line 35, for " " read -- ] --. Column 10, line 39, for " " read -- ] --. Column 10, line 41, for "%-" read -- 5- --. Column 10, line 52, for " " read -- ] --. Column 10, line 59, for " " read -- ] --. Column 10, line 62, for " " read -- ] --.

UNITED STATES PATENT OFFICE
CERTIFICATE OF CORRECTION

Patent No. 3,624,079      Dated November 30, 1971

Inventor(s) Daniel Lednicer

It is certified that error appears in the above-identified patent and that said Letters Patent are hereby corrected as shown below:

Column 10, line 66, for " " read -- 5-[α-(p-hydroxyphenyl)-p-methoxystyryl]-3-methylisoxazole --. Column 10, line 72, for "methylisoxazote" read -- methylisoxazole --. Column 10, line 75, for "[ααp-α2-(1" read -- [α-[p-[2-(1 --. Column 11, line 4, for "Example 7" read -- (Example 7) --. Column 11, line 6, for "hydride i mineral" read -- hydride in mineral --. Column 11, line 7, for "of 1 mixture" read -- of a 1:1 mixture --. Column 11, line 29, for "hydrochlorides so obtained are:" read -- thereof. Representative of the 3-methyl-5-[α-[[2-(tertiaryamino)alkoxy]-phenyl]styryl]isoxazoles and hydrochlorides so obtained are: --. Column 11, line 30, for "[-(1-pyrrolidinyl]ethoxy]-" read -- [2-(1-pyrrolidinyl]ethoxy]- --. Column 11, line 36, for "ethoxyl]-" read -- ethoxy]- --. Column 11, line 41, for "2" read -- 3 --. Column 12, line 44, for "is p-methyl" read -- $R_1$ is hydrogen. --. Column 12, line 45, for "113-115° C." read -- 110-113° C. --.

Signed and sealed this 6th day of June 1972.

(SEAL)
Attest:

EDWARD M. FLETCHER, JR.
Attesting Officer

ROBERT GOTTSCHALK
Commissioner of Patents